United States Patent [19]

Nikami et al.

[11] 4,081,728
[45] Mar. 28, 1978

[54] DC MOTOR CONTROL CIRCUIT

[75] Inventors: Akira Nikami, Yokohama; Choei Kuriki, Tokyo, both of Japan

[73] Assignee: Sony Corporation, Tokyo, Japan

[21] Appl. No.: 707,041

[22] Filed: Jul. 20, 1976

[30] Foreign Application Priority Data

Jul. 24, 1975 Japan ................................ 50-90642

[51] Int. Cl.² ............................................. H02P 5/06
[52] U.S. Cl. ..................................... 318/318; 318/398
[58] Field of Search ............... 318/318, 326, 329, 396, 318/397, 398, 314

[56] References Cited

U.S. PATENT DOCUMENTS

| 3,277,395 | 10/1966 | Grindle et al. | 332/15 |
| 3,518,516 | 6/1970 | Pawletko | 318/396 |
| 3,586,946 | 6/1971 | Sadaghige et al. | 318/326 |
| 3,806,678 | 4/1974 | Inaba | 318/318 |
| 3,855,512 | 12/1974 | Konrad | 318/139 |

Primary Examiner—David Smith, Jr.
Attorney, Agent, or Firm—Lewis H. Eslinger; Alvin Sinderbrand

[57] ABSTRACT

A DC motor control circuit is provided with a starter circuit responsive to the frequency of a rotational signal derived from a signal generator attached to the DC motor. The starter circuit includes a monostable multivibrator which ceases to operate when the frequency of the rotational signal exceeds a predetermined frequency.

10 Claims, 29 Drawing Figures

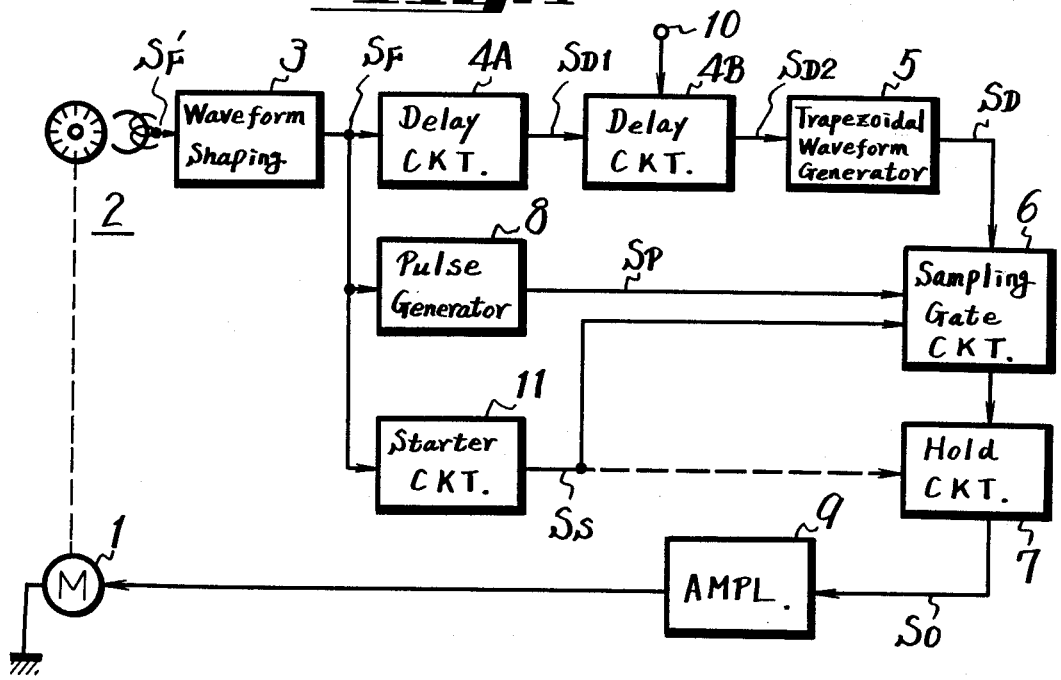

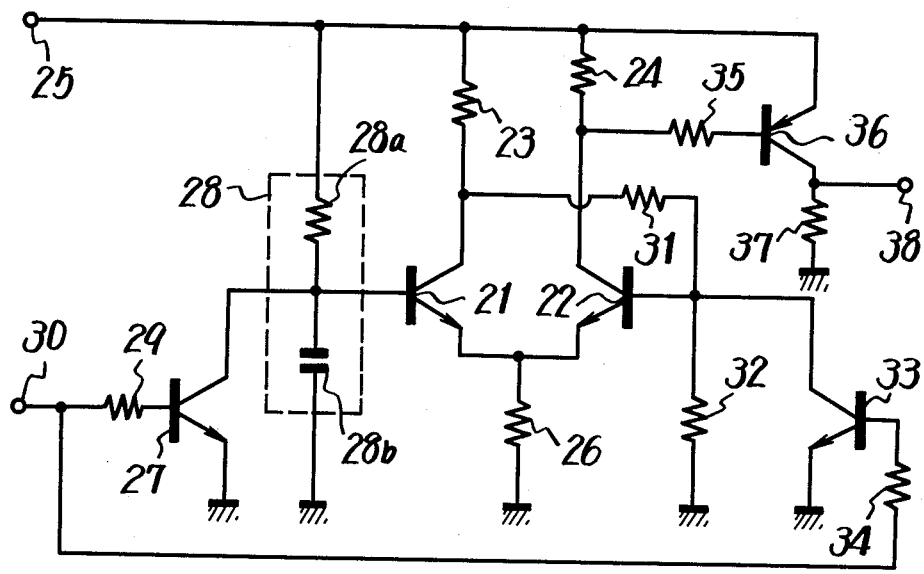
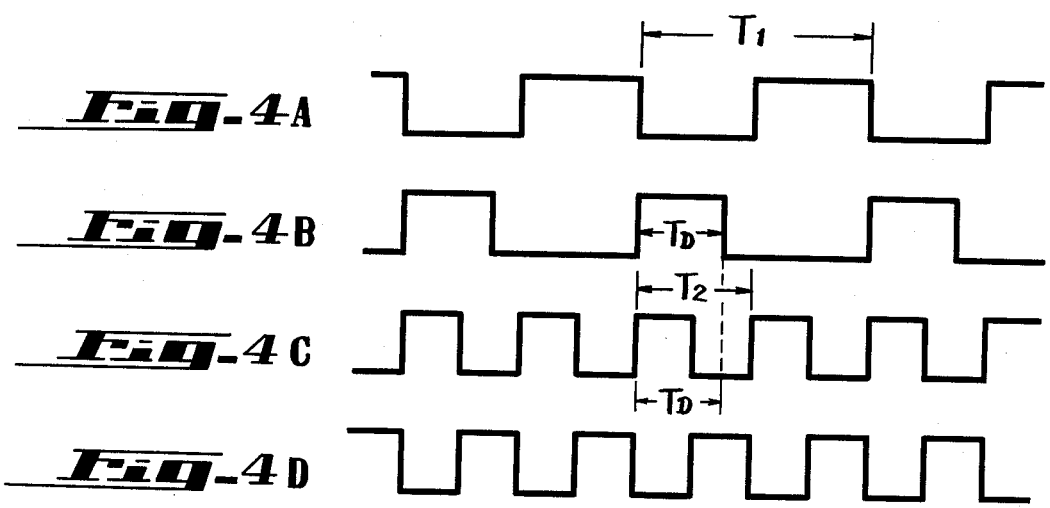

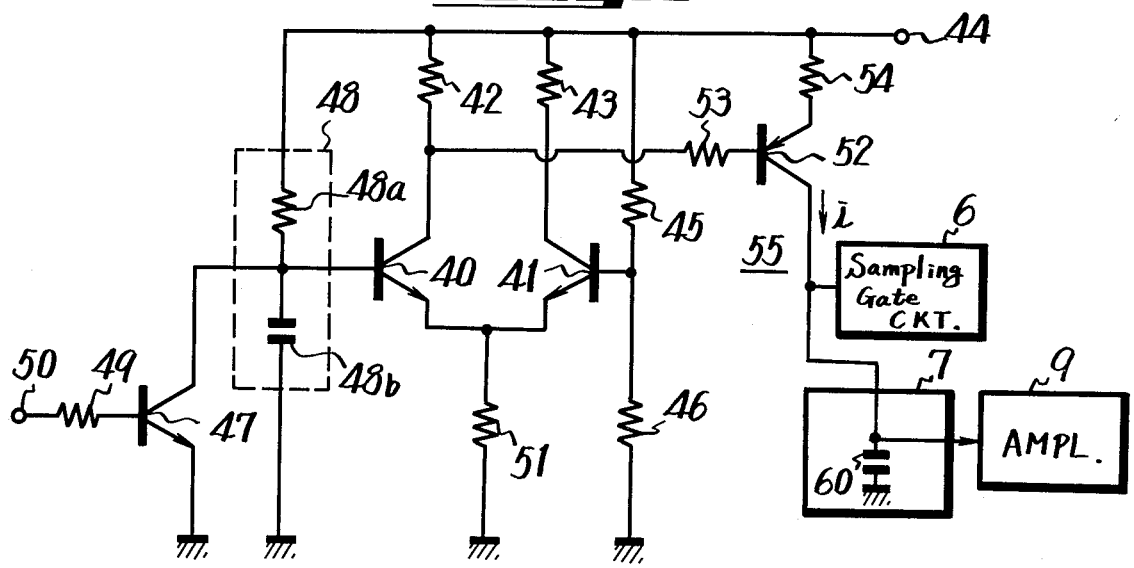
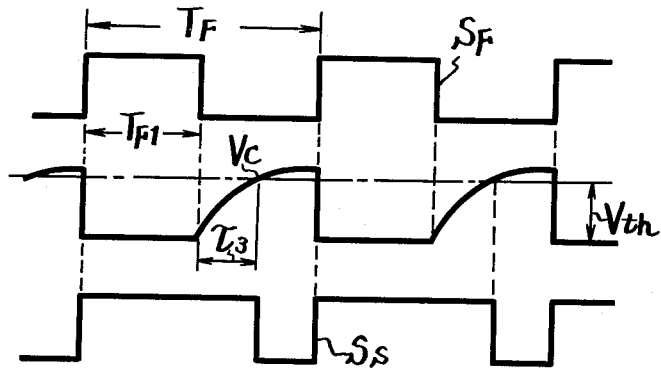
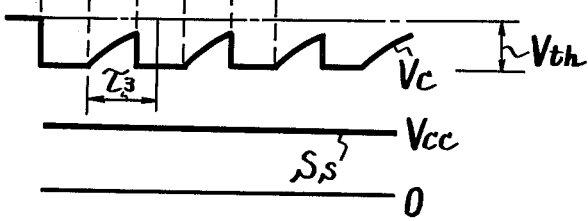

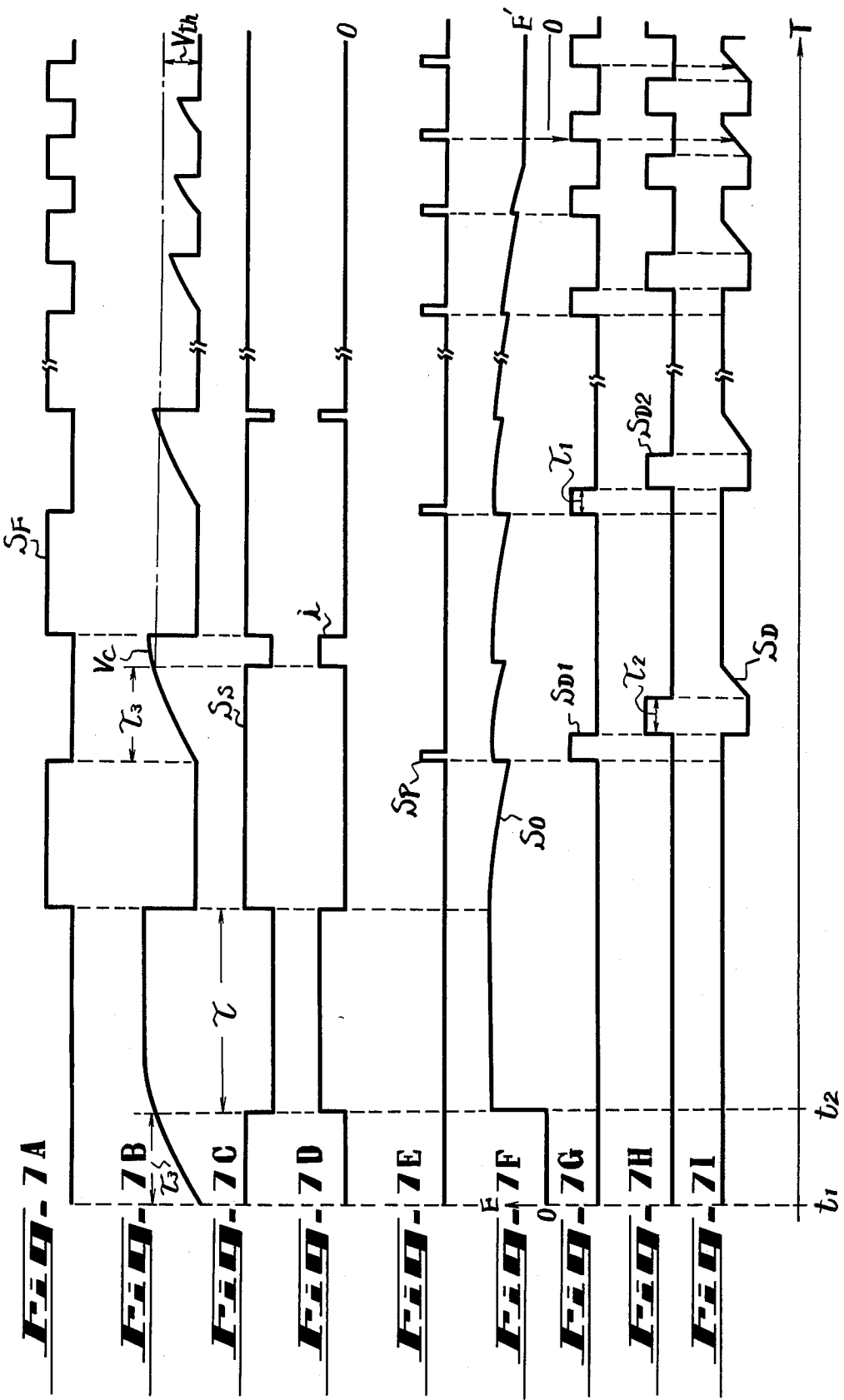

DC MOTOR CONTROL CIRCUIT

BACKGROUND OF THE INVENTION

1. Field of the Invention

This invention relates generally to a DC motor control circuit and is directed more particularly to a DC motor control circuit to be used in such devices as audio and video tape recorders.

2. Description of the Prior Art

In such devices as audio and video tape recorders, the rotational velocity of the DC motor has been maintained by a speed servo control circuit.

However, with a prior art speed servo control circuit, if the lock-in time of a servo to the DC motor is excessive at the start and the rotational velocity of the DC motor is significantly reduced or increased, the DC motor may become locked at a phantom lock-in point. Further, a prior art speed servo control is known which includes a starter circuit that directly supplies the DC motor with the power source voltage for a predetermined time in accordance with the operation of a power source switch or function switch. A servo loop is formed after the DC motor approaches a predetermined rotational velocity. With such a prior art control circuit, a DC motor suddenly stopped in its rotation, remains stalled until it is supplied with a start signal.

OBJECTS AND SUMMARY OF THE INVENTION

Accordingly, it is an object of the present invention to provide a novel and effective control circuit for driving a DC motor as employed in such devices as audio and video tape recorders.

Another object of the invention is to provide a novel and effective circuit for a DC motor which uses a rotational signal generated in response to the rotation of the DC motor.

In accordance with an aspect of the present invention the DC motor control circuit comprises means which are responsive to the rotational signal generated in accordance with the rotational velocity of the DC motor and which defeat the function of a normal speed servo control loop until the DC motor arrives at a predetermined rotational velocity. The lock-in time of the DC motor from its start to its predetermined rotational number is shortened and a phantom lock-in point, which appears before the DC motor arrives at its normal rotational number, will be avoided. It is a further feature of this invention that a circuit which shows a frequency responsive property is inserted into the speed servo control loop of the invention, so that the generation of a phantom lock-in point as the DC motor rotates at a speed higher than its normal speed can be prevented.

The above and other objects, features and advantages of the invention will be apparent from the following description which is to be read in conjunction with the accompanying drawings.

BRIEF DESCRIPTION OF THE DRAWINGS

FIG. 1 is a block diagram showing an entire system according to an embodiment of this invention;

FIGS. 2A to 2G illustrate waveforms to which references will be made in explaining the operation of the embodiment of this invention shown in the FIG. 1;

FIG. 3 is a schematic diagram of a frequency responsive time delay circuit by means of which the delay circuit shown in the embodiment of FIG. 1 may be implemented.

FIG. 4A to 4D illustrate waveforms to which reference will be made in explaining the operation of the frequency responsive time delay circuit shown in FIG. 3;

FIG. 5 is a schematic diagram of a frequency responsive starter circuit by means of which the starter circuit shown in the embodiment of FIG. 1 may be implemented;

FIGS. 6A to 6F illustrate waveforms to which reference will be made in explaining the operation of the frequency responsive function of the starter circuit shown in FIG. 5; and FIGS. 7A to 7I illustrate waveforms to which reference will be made in explaining the operation of the entire control system.

DESCRIPTION OF THE PREFERRED EMBODIMENTS

Referring to FIG. 1 which shows an entire system according to an embodiment of this invention, a DC motor 1 rotates a frequency generator 2. The frequency generator 2 produces a rotational signal $S_F'$ waveform A of FIG. 2 which is desired in accordance with the rotation of the DC motor 1. In an embodiment of this invention, the frequency of the rotational signal $S_F'$ is selected to be about 360 $H_Z$ at the desired locked rotational velocity of the DC motor 1, but other frequencies may be selected.

The rotational signal $S_F'$ from the frequency generator 2 is applied to a waveform shaping circuit 3 from which the rotational signal $S_F$ (waveform B of FIG. 2) is obtained.

The rotational signal $S_F$ is applied simultaneously to a series connection of delay circuits 4A and 4B, a pulse generator 8, and a starter circuit 11. Each delay circuit 4A and 4B comprises a monostable multivibrator operating at the falling edge of an applied signal. Thus, the first delay circuit 4A produces a first delayed output $S_{D1}$ (waveform C of FIG. 2), and the second delay circuit 4B, which is supplied with the delayed output $S_{D1}$, produces a second delayed output $S_{D2}$ (waveform D of FIG. 2). The second delay output a trapezoidal waveform, the compared output signal $S_D$ (waveform E of FIG. 2). The trapezoidal waveform generator 5 is set by the falling edge of the second delayed output signal $S_{D2}$ and reset with the rising edge thereof.

A sampling signal $S_p$ (waveform F of FIG. 2) is obtained from the pulse generator 8 in response to the rotational signal $S_F$. The sampling signal $S_P$ is produced by the pulse generator 8 at the falling edge of the rotational signal $S_F$ and applied to the sampling gate circuit 6. The compared output signal $S_D$ is applied to the sampling gate circuit 6, sampled by the sampling signal $S_p$, and then held by a hold circuit 7. The hold circuit comprises a capacitor (component 60 of FIG. 5). The output signal from the hold circuit 7, the speed control signal $S_o$ (waveform G of FIG. 2), is applied to a DC amplifier 9 to control the rotational velocity of the DC motor 1. Because the phase of the sampling signal $S_p$ and compared signal $S_D$ changes in response to the rotational velocity of the DC motor 1, the DC level E of the speed control signal $S_o$ also changes in response to the rotational velocity of the DC motor 1, providing velocity control.

Referring to FIG. 3, a monostable multivibrator such as shown may be used in the delay circuits 4A and 4B.

Note that the delay ciruits 4A and 4B cease to function as multivibrators, but behave as inverters, when signals having frequencies greater than a predetermined frequency are applied to them. The delay circuits 4A and 4B thus exhibit a frequency discrimination function.

Referring to FIG. 3, 21 and 22 designate a pair of transistors connected differentially. The collector electrodes of the transistors 21 and 22 are connected through resistors 23 and 24 respectively to a power source terminal 25, and the emitter electrodes of the transistors 21 and 22 are connected together to the ground through a common resistor 26. The base electrode of the transistor 21 is connected to the collector electrode of a transistor 27 and to a time constant circuit 28 formed of a resistor 28a and a capacitor 28b. The emitter electrode of the transistor 27 is grounded and its base electrode is connected through a resistor 29 to an input terminal 30. The base electrode of the transistor 22 is connected to the connection point of resistors 31 and 32, which are connected between the collector electrode of the transistor 21 and the ground, and also to the collector electrode of a transistor 33 whose base electrode is connected through a resistor 34 to the input terminal 30. The collector electrode of the transistor 22 is connected through a resistor 35 to the base electrode of a transistor 36 whose emitter electrode is connected to the power source terminal 25 and whose collector electrode is grounded through a resistor 37 and connected to an output terminal 38.

The operation of the monostable multivibrator shown in FIG. 3 will be now described with reference to FIG. 4. When a signal having a frequency $F_1$ (period $T_1$) (waveform A of FIG. 4) which is lower than a predetermined frequency $F_O$ (period T.) supplied to the input terminal 30, the transistors 27 and 33 are driven to an ON-state while the input signal is high in level. As a result, the transistors 21 and 22 are held in an OFF-state and the collector electrode voltage of transistor 22 changes to a high level. Transistor 36 is consequently driven to an OFF-state and an output signal of low level, (waveform B of FIG. 4) appears at the output terminal 38. At this time, the charge on the capacitor 28b of the time constant circuit 28 is discharged through the transistor 27. Thereafter, when the input signal changes to a low level, the transistors 27 and 33 are held in an OFF-state. At this time, the transistor 21 is still in an OFF-state but the transistor 22 is driven to an ON-state. Accordingly, the transistor 36 is driven to an ON-state and hence the output signal changes from a low level to a high level (waveform B of FIG. 4). Thereafter, the capacitor 28b is charged through the resistor 28a. When the voltage across the capacitor 28b becomes higher than the base voltage of the transistor 22, which is determined by the resistor 31, 32 and (23), the transistor 21 is driven to an ON-state while transistor 22 is held to an OFF-state. As a result, the output signal changes to a low level (waveform B of FIG. 4). A time interval $T_D$ within which the output signal is held to a high level is determined by the time constant circuit 28 is and selected as one-half of the period $T_0$ of the signal with the predetermined frequency $F_0$ ($T_D = \frac{1}{2}T_0$).

Next, when an input signal having a frequency higher than the predetermined frequency $F_0$ (period $T_0$), such as a signal whose frequency is $F_2$ (period $T_2$) (waveform C of FIG. 4), is applied to the input terminal 30, the output signal from terminal 38 is held to a low level while the input signal is of a high level, as previously discussed. Further, when the input signal is of a low level, the output signal is of a high level. However, the level of the input signal becomes high before arriving of the interval $T_D$ determined by the time constant circuit 28, driving the output signal to a low level. In such circumstances, the monostable multivibrator of FIG. 3 operates at an inverter. The use of such a circuit prevents the generation of a phantom lock-in point, which otherwise may appear when the motor exceeds a reference speed.

When the motor control system shown in FIG. 1 is employed in a video tape recorder with a rotary magnetic head, a phase error signal, which is obtained by comparing the rotational phase signal of the rotary magnetic head driven by the motor with the reference phase signal, is supplied to a terminal 10 shown in FIG. 1 to control the time constant of the monostable multivibrator 4B.

A starting signal $S_s$ is obtained from the starter circuit of FIG. 1 to which the rotational signal $S_F$ is applied. The starter circuit 11 is responsive to the frequency of the rotational signal $S_F$ and is operative until the DC motor 1 of FIG. 1 is driven to a particular rotational velocity less than the desired rotational velocity.

A practical embodiment of the starter circuit 11 will be now described with reference to FIG. 5, the starter circuit 11 has a pair of transistors 40 and 41 whose collector electrodes are connected through resistors 42 and 43 respectively to a DC power source terminal 44. The base electrode of the transistor 41 is connected to the connection point between series connected resistors 45 and 46 so that the base electrode of the transistor 41 is supplied with a predetermined reference potential. The base electrode of transistor 40 is connected in parallel with a switching transistor 47 and a capacitor 48b. The base electrode of transistor 40 is also connected to resistor 48a which, together with capacitor 48b, forms time constant circuit 48. A starting signal $S_s$ appears at the collector of transistor 40. The base electrode of the transistor 47 is supplied with an input signal through a resistor 49 from an input terminal 50. The emitter electrodes of the transistors 40 and 41 are ground through a common resistor 51.

The starting signal S, is supplied to a current source 55 formed of a transistor 52 and resistors 53 and 54 so as to produce an operating (starting) current i which will operate the sampling gate circuit 6.

The operation of the starter circuit 11 will now be described with reference to FIG. 6.

The capacitor 48b of the time constant circuit 48 is charged and discharged in accordance with the state of transistor 47, which is controlled by the rotational signal $S_F$ (waveform A of FIG. 6). When the charging voltage $V_c$ (waveform B of FIG. 6) of the capacitor 48b exceeds a voltage $V_{th}$ determined by the resistors 45 and 46, the transistor 40 is driven to and On state. Therefore, the collector of the transistor 40 provides the starting signal $S_S$ whose duty at high level relative to the duty of the rotational signal $S_F$ is increased by the delayed period $\tau_3$ of the time constant circuit 48 (waveform C of FIG. 6). The current i necessary for driving the sampling gate circuit 6 is obtained during the low level interval of the starting signal $S_S$. Given that the period of the rotational signal $S_F$ is taken as $T_F$ and its pulse width is taken as $T_{F1}$, when the delay time period $\tau_3$ of the time constant circuit 48 is shorter than the pulse width $F_{F1}$; the starting signal $S_S$ will be obtained (waveform C of FIG. 6).

However, when the DC motor 1 beomes high in rotational speed, the rotational signal $S_F$ increases in frequency and the pulse width $F_{F1}$ thereof becomes shorter than the delay time period $\tau_3$ (waveforms D and E of FIG. 6). The charging voltage $V_c$ of capacitor 48b does not read the voltage $V_{th}$ necessary to drive the transistor 40 to an ON state before switching transistor 47 is driven to an ON state. As a result, transistor 40 remains in an OFF state. Thus, when the DC motor 1 is driven at such a speed that the frequency $f_F(=1/T_F)$ of the rotational signal $S_F$ becomes more than $\frac{1}{2}\tau_3$, the transistor 52 remains in an OFF-state and the sampling pulse current i necessary for motor starting is not obtained. The starter circuit 11 ceases to operate (waveform F of FIG. 6)

As described above, the starter circuit 11 is a frequency dependent type starter circuit which stops its starting operation when the rotational velocity of the DC motor 1 is higher than a predetermined value but carries out its starting operation when the rotational velocity of the DC motor 1 is lower than the predetermined value or is equal to zero.

The operation of the starter circuit is now described in reference to FIG. 7.

When power is applied to the starter circuit 11 at a time $t_1$ capacitor 48b begins to charge. At a time $t_2 = t_1 + t_3$ the sampling gate circuit 6 is opened to pass the compared output signal $S_D$ from the trapezoidal waveform generator 5 to the hold circuit 7.

Note that the output signal $S_D$ from the trapezoidal waveform generator 5 is always kept at a predetermined positive potential when the delayed output signal $S_{D2}$ is not fed to the trapezoidal waveform generator 5 (waveforms H and I of FIG. 7). Accordingly, when sampling gate circuit 6 is opened by the sampling pulse current; a relatively high voltage is fed through the hold circuit 7 to the DC motor. The DC motor 1 begins to rotate at time $t_2$.

As the DC motor 1 rotates, the rotational signal $S_F$ is obtained. At this time, the sampling signal $S_P$ is also produced, so that the sampling gate circuit 6 is operated by both the signals $S_F$ and $S_p$. Until the rotational speed of the DC motor 1 arrives at a predetermined speed, the sampling gate circuit 6 is operated principally by the starting signal $S_S$, and the effect of the sampling $S_P$ is minute. The sampling pulse current i (waveform D of FIG. 7) carries out the sampling.

If the frequency of the rotational signal $S_F$ to be locked is about 360 $H_Z$, the predetermined frequency can be in the range of 100 to 200 $H_Z$. The time constant $\tau_3$ of the time constant circuit 48 is selected so that the starter circuit 11 is operated until the rotational signal $S_F$ arrives at this predetermined frequency. Above this predetermined frequency the DC motor 1 is driven in accordance with the value sample by the sampling signal $S_P$ to be locked at the desired rotational velocity.

If the rotational velocity of the DC motor 1 is abnormally decreased beyond a predetermined value, the starter circuit 11 immediately becomes operative and accelerates the DC motor 1 toward its normal rotational velocity. Provided the starter circuit 11 is supplied with the operating voltage $V_{cc}$ at terminal 44, the starting signal $S_s$ is produced, even if the DC motor 1 is stalled.

As an alternative, the starting signal $S_s$ may be made to bypass the sampling gate circuit 6 and directly determine the value of the speed control signal $S_o$. Referring to the dashed line of FIG. 5, the starting signal $S_s$ generates a sampling pulse current i by the current source 55, and this sampling pulse current i is applied to capacitor 60 of the hold current 7, providing a voltage which is fed to the DC motor 1 through the DC amplifier 9.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

We claim as our invention:

1. A DC motor control circuit comprising:
   a DC motor the rotational speed of which is to be controlled;
   means for producing a rotational signal at a frequency corresponding to the rotational speed of said DC motor;
   means for producing a train of pulses at a repetition rate dependent on said frequency of the rotational signal, each of said pulses having a portion varying with time and occurring with a predetermined delay when said frequency of the rotational signal is lower than a first predetermined frequency;
   means for providing sampling signals at intervals dependent on said frequency of the rotational signal;
   sampling means receiving said train of pulses and being made operative by said sampling signals for sampling said pulses and for providing a control voltage varying with the deviation of said rotational speed from a predetermined velocity;
   drive means for controlling said rotational speed in accordance with said control voltage; and
   starter means responsive to said rotational signal for providing a maximum level of said control voltage to said drive means when said frequency of the rotational signal is below a second predetermined frequency.

2. A DC motor circuit according to claim 1; wherein said means for producing a train of pulses includes delay circuit means and compared signal generating means.

3. A DC motor control circuit according to claim 2; wherein said delay circuit means includes a monostable multivibrator which operates as an inverter in respect to said rotational signal when said frequency of the rotational signal is higher than said first predetermined frequency.

4. A DC motor control circuit according tO claim 1; wherein said rotational signal has a rectangular waveform and said means for providing sampling signals includes a sampling pulse generator which produces said sampling signal at each falling edge of said rectangular waveform.

5. A DC motor control according to claim 1; wherein said sampling means includes sampling gate circuit means in which said train of pulses is sampled by said sampling signals, and hold circuit means operative to hold the output of said sampling gate circuit and to correspondingly provide said control voltage.

6. A DC motor control circuit according to claim 1; wherein said starter means includes means providing a start signal, and means responsive to said start signal for sampling said pulses at a high level thereof only when said frequency of the rotational speed is below said second predetermined frequency; and in which said second predetermined frequency corresponds to a rotational velocity of the motor lower than the desired operating velocity thereof.

7. A DC motor control circuit according to claim 6; wherein said starter means includes a monostable multivibrator having a time constant determined in accordance with said second predetermined frequency.

8. A DC motor control circuit according to claim 6; wherein said means responsive to said start signal provides a relatively high sampling current, and wherein said sampling means includes sampling gate circuit means responsive to said high sampling current so as to increase the period during which said pulses are sampled at a high level thereof by said sampling gate circuit means.

9. A DC control circuit according to claim 6; wherein said means responsive to said start signal provides a relatively high sampling current, and wherein said sampling means includes a hold circuit means which is responsive to said high sampling current so as to directly increase said level of the control voltage.

10. A DC motor control circuit according to claim 1; wherein said drive means includes a DC amplifier which amplifies said control voltage and applies said amplified control voltage to said DC motor.

* * * * *